United States Patent
Hung

(10) Patent No.: US 11,788,675 B2
(45) Date of Patent: Oct. 17, 2023

(54) JOINT DEVICE OF A SUPPORT FRAME

(71) Applicant: MODERNSOLID INDUSTRIAL CO., LTD., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 11 days.

(21) Appl. No.: 17/695,389

(22) Filed: Mar. 15, 2022

(65) Prior Publication Data
US 2022/0299155 A1 Sep. 22, 2022

(30) Foreign Application Priority Data
Mar. 17, 2021 (TW) ................................. 110109543

(51) Int. Cl.
*F16M 11/20* (2006.01)

(52) U.S. Cl.
CPC ... *F16M 11/2021* (2013.01); *F16M 2200/022* (2013.01); *F16M 2200/044* (2013.01); *Y10T 403/32319* (2015.01)

(58) Field of Classification Search
CPC ..... Y10T 403/32254; Y10T 403/32262; Y10T 403/32319; Y10T 403/32327; Y10T 403/32401; Y10T 403/32409; Y10T 403/32418; Y10T 403/32426; Y10T 403/32434; F16M 11/10; F16M 11/2021; F16M 2200/022; F16M 2200/041; F16M 2200/044
See application file for complete search history.

(56) References Cited

U.S. PATENT DOCUMENTS

| | | | | |
|---|---|---|---|---|
| 4,770,384 A | * | 9/1988 | Kuwazima | F21V 21/26 248/281.11 |
| 4,969,232 A | * | 11/1990 | Michel | B60B 33/0002 16/350 |
| 5,179,447 A | * | 1/1993 | Lain | A47C 7/723 348/827 |

(Continued)

FOREIGN PATENT DOCUMENTS

| CN | 106838569 B | 7/2019 |
|---|---|---|
| CN | 212584582 U | 2/2021 |

OTHER PUBLICATIONS

Search Report appended to an Office Action, which was issued to Taiwanese counterpart application No. 110109543 by the TIPO dated Oct. 8, 2021, with an English translation thereof.

*Primary Examiner* — Jonathan Liu
*Assistant Examiner* — Guang H Guan
(74) *Attorney, Agent, or Firm* — Burris Law, PLLC

(57) ABSTRACT

A joint device includes a base seat having a mounting hole with a tapered portion, and a rotating seat rotatably connected to the base seat. The tapered portion has large and small diameter ends. A shaft assembly includes a rotating shaft fixed to the rotating seat and inserted into the mounting hole, a one-way bearing sleeved on and frictionally engaged with the rotating shaft, and a tightening member press-fitted between an inner surface of the base seat and the one-way bearing. The tightening member has a C-shaped body with a gap that gradually reduces as the tightening member gradually moves from the large to the small diameter ends of the tapered portion.

7 Claims, 15 Drawing Sheets

(56) References Cited

U.S. PATENT DOCUMENTS

| | | | | |
|---|---|---|---|---|
| 5,996,954 | A * | 12/1999 | Rosen | B60R 11/0235 |
| | | | | 248/278.1 |
| 6,487,882 | B2 * | 12/2002 | Trempala | A62C 35/68 |
| | | | | 403/370 |
| 7,261,272 | B2 * | 8/2007 | Courbon | B60R 1/076 |
| | | | | 248/478 |
| 7,317,611 | B2 * | 1/2008 | Dittmer | F16M 11/10 |
| | | | | 248/917 |
| 9,732,901 | B2 * | 8/2017 | Satterfield | F16M 13/02 |
| 11,365,009 | B2 * | 6/2022 | Gilbert | B64D 11/0639 |
| 11,629,812 | B2 * | 4/2023 | Freienmuth | F16M 13/02 |
| | | | | 248/183.1 |
| 2014/0001331 | A1 | 1/2014 | Oddsen, Jr. et al. | |
| 2022/0299155 | A1 * | 9/2022 | Hung | F16M 11/2064 |
| 2022/0299156 | A1 * | 9/2022 | Hung | F16M 11/18 |

* cited by examiner

JOINT DEVICE OF A SUPPORT FRAME

CROSS-REFERENCE TO RELATED APPLICATION

This application claims priority to Taiwanese Patent Application No. 110109543, filed on Mar. 17, 2021.

FIELD

The disclosure relates to a component of a support frame, and more particularly to a joint device of a support frame.

BACKGROUND

Referring to FIGS. 1 and 2, a microphone support frame 1, as disclosed in Chinese Patent No. CNB205579086U, includes a fixed rod 11, two lower arms 12, two upper arms 13 and a movable rod 14. Each of the lower and upper arms 12, 13 has a lower end and an upper end. The lower ends of the lower arms 12 are pivotally connected to the fixed rod 11, while the upper ends thereof are pivotally connected to the lower ends of the upper arms 13. The movable rod 14 is used for fixing a microphone 9, and is rotatably and pivotally connected to the upper ends of the upper arms 13. As shown in FIG. 1, an angle (θ1) is formed between the lower arm 12 and the fixed rod 11, an angle (θ2) is formed between the lower arm 12 and the upper arm 13, and an angle (θ3) is formed between the movable rod 14 and the upper arm 13. Through this, three movable joints 15 are formed, and three threaded bolts 16 are respectively connected to the movable joints 15. When the threaded bolts 16 are loosened, the angles (θ1, θ2, θ3) can be adjusted, and after the adjustment, the threaded bolts 16 are tightened to fix the angles (θ1, θ2, θ3).

However, during adjustment of the angles (θ1, θ2, θ3), the threaded bolts 16 are loosened one by one, and are tightened also one by one to fix the angles (θ1, θ2, θ3), so that the aforesaid microphone support frame 1 is inconvenient to use, and needs an improvement.

SUMMARY

Therefore, an object of the present disclosure is to provide a joint device that is easy to use.

According to this disclosure, a joint device configured to be connected to a support frame comprises a base seat, a rotating seat and a shaft assembly. The base seat has an inner surface surrounding a joint axis and defining a mounting hole that extends therethrough. The mounting hole has a tapered portion with a large diameter end and a small diameter end opposite to each other along the joint axis. The rotating seat is rotatably connected to the base seat. The rotating seat and the base seat are rotatable relative to each other about the joint axis.

The shaft assembly includes a rotating shaft fixed to the rotating seat and inserted into the mounting hole of the base seat, a one-way bearing sleeved on the rotating shaft and located in the tapered portion of the mounting hole, and a tightening member inserted into the mounting hole and press-fitted between the inner surface of the base seat and the one-way bearing. The rotating shaft is rotatable with the rotating seat relative to the base seat about the joint axis. The one-way bearing has an inner friction surface frictionally engaged with the rotating shaft, and an outer friction surface radially opposite to the inner friction surface. The tightening member has a C-shaped body with a gap between two ends thereof, and has an inner peripheral surface frictionally engaged with the outer friction surface of the one-way bearing, and an outer peripheral surface radially opposite to the inner peripheral surface and pressed against the inner surface of the base seat. The outer peripheral surface of the tightening member has a shape matching that of the tapered portion of the mounting hole. The gap of the tightening member gradually reduces as the tightening member gradually moves between the inner surface of the base seat and the one-way bearing from the large diameter end to the small diameter end of the tapered portion of the mounting hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
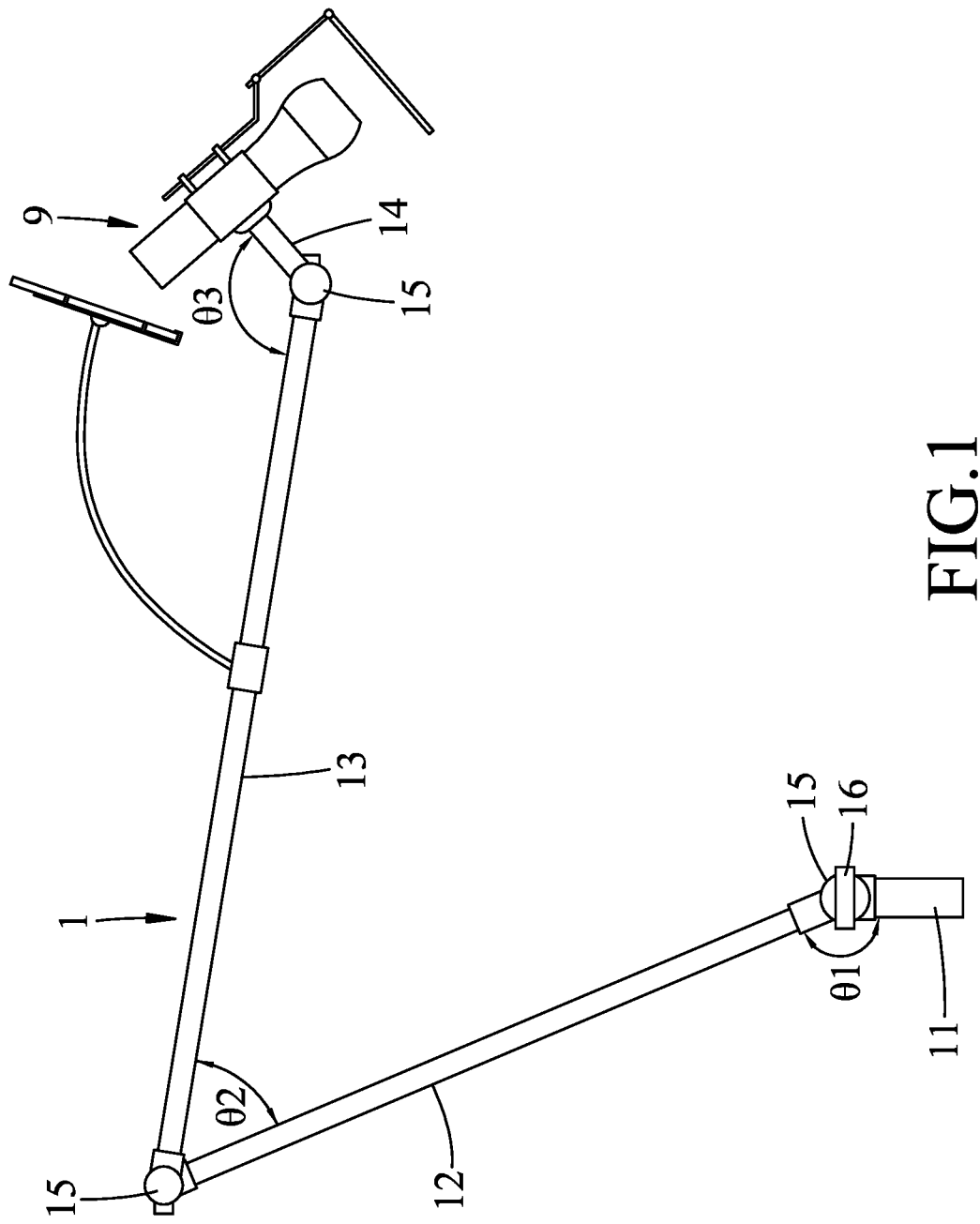
FIG. 1 is a side view of a microphone support frame disclosed in Chinese Patent No. CNB205579086U.
Figure 2:
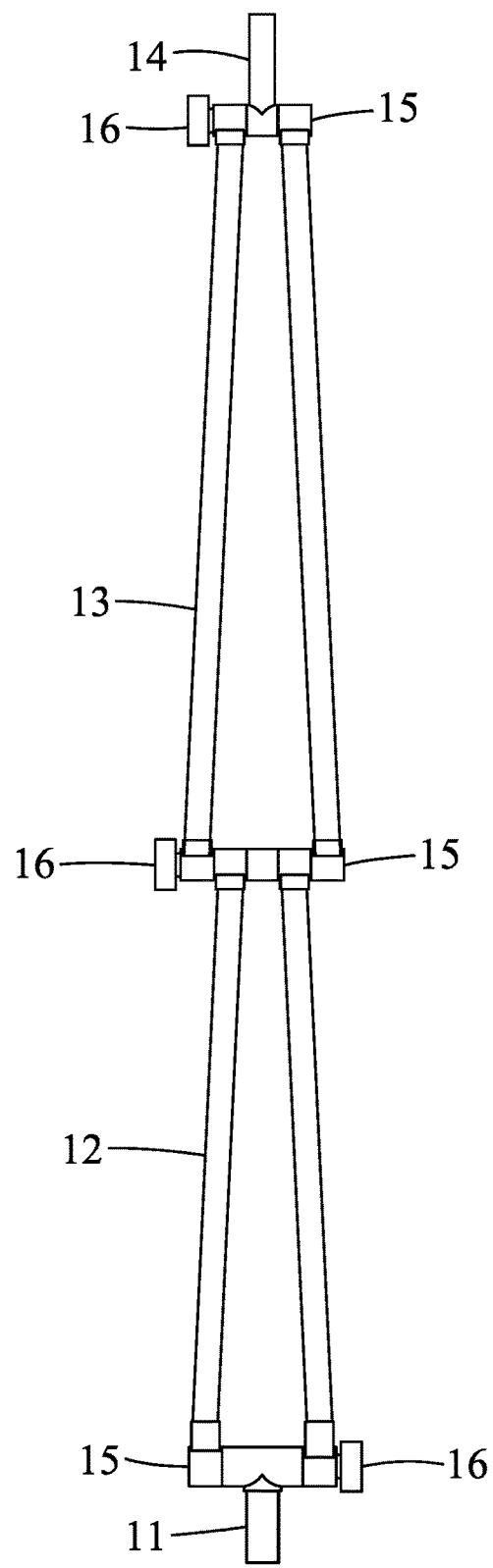
FIG. 2 is a fragmentary top view of the microphone support frame of FIG. 1.
Figure 3:
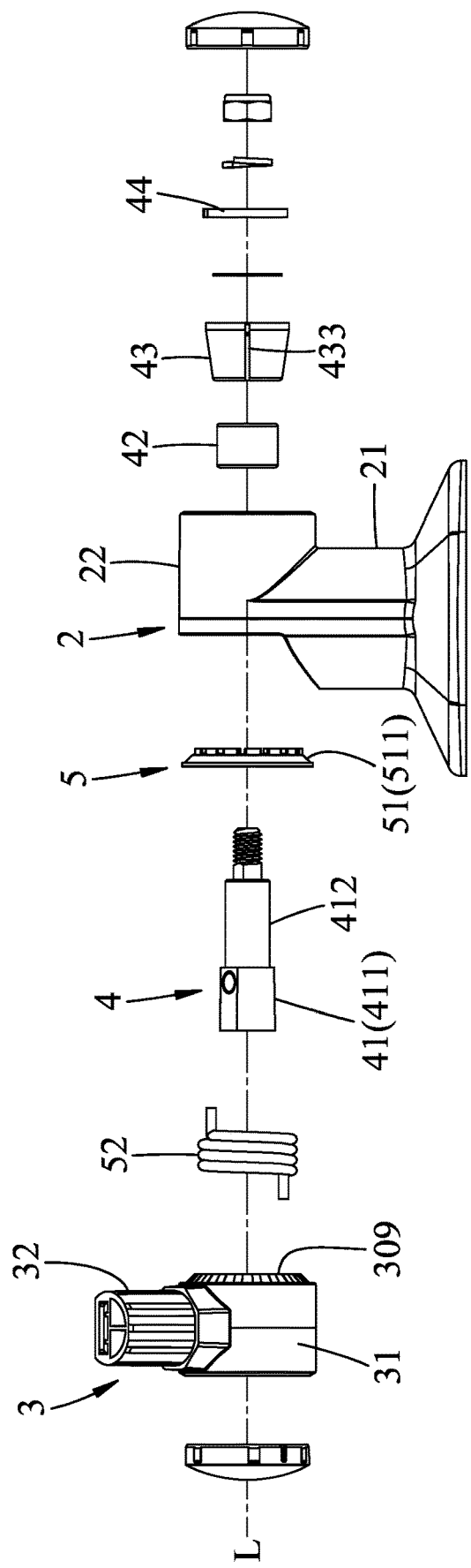
FIG. 3 is an exploded perspective view of a joint device according to an embodiment of the present disclosure.
Figure 4:
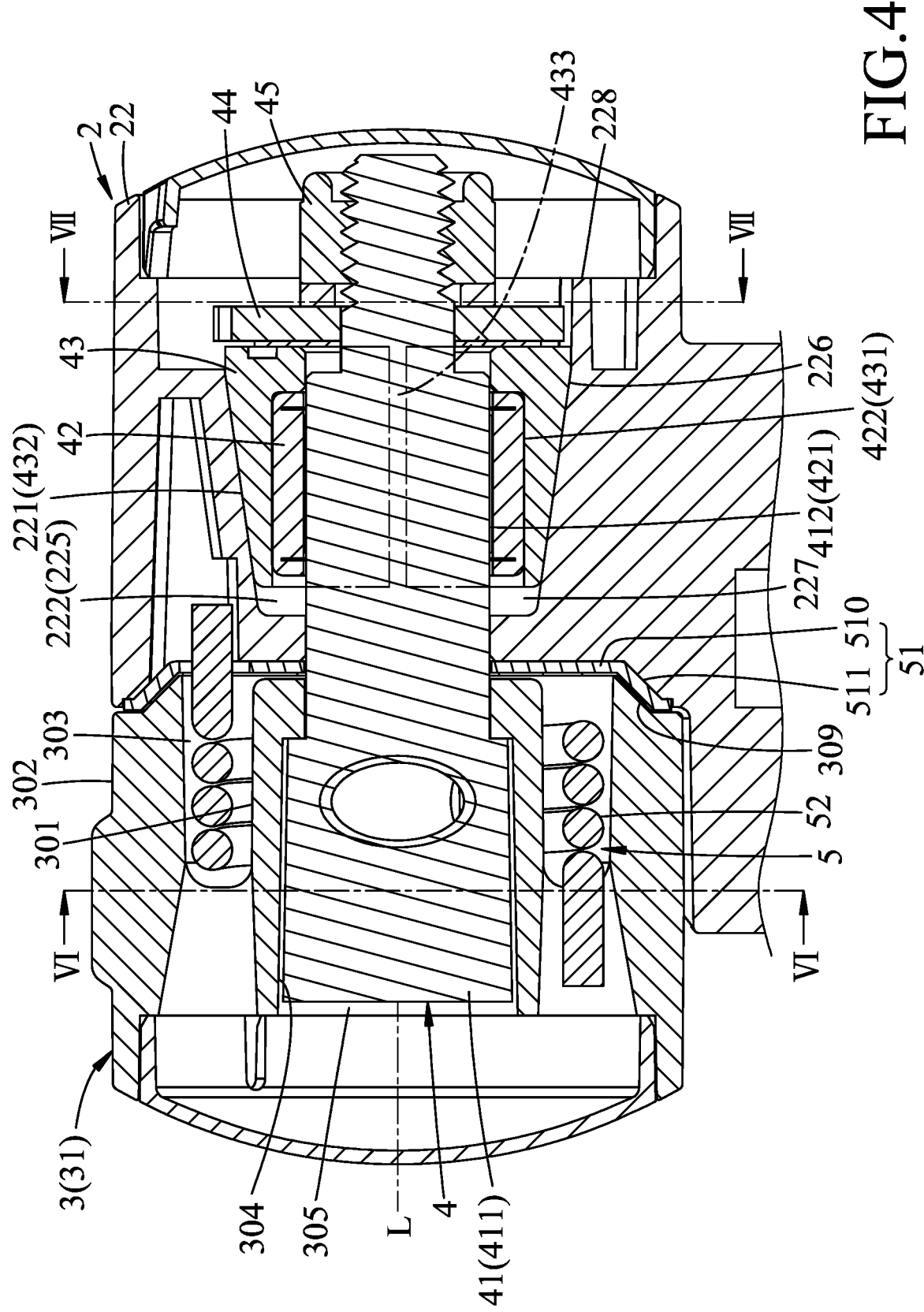
FIG. 4 is a fragmentary assembled sectional view of the embodiment.
Figure 5:
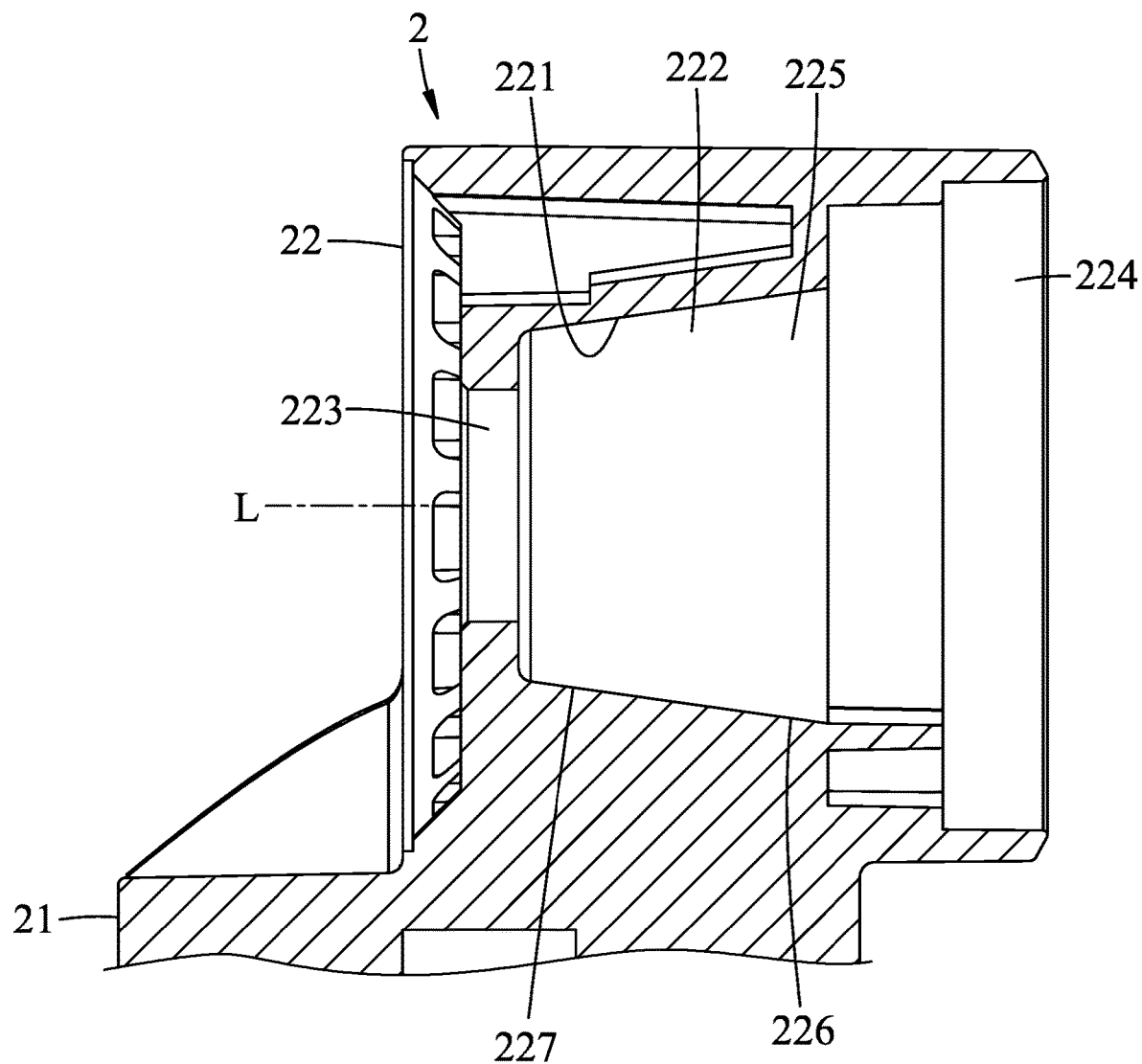
FIG. 5 is a fragmentary sectional view of a base seat of the embodiment.

Referring to FIGS. 3 to 5, a joint device according to an embodiment of the present disclosure includes a base seat 2, a rotating seat 3, a shaft assembly 4, and a resistance unit 5. The joint device of this disclosure is configured to be connected to a support frame (not shown). The support frame is used for fixing a microphone, a display or other items. Through the provision of the joint device, angle of use of the microphone, the display or the other items can be adjusted accordingly.

The base seat 2 includes a base portion 21, and a tubular portion 22 supported on a top side of the base portion 21 and defining a joint axis (L). The base portion 21 is configured to be fixed to a fixed surface, such as a table top (not shown) or a wall surface (not shown). The tubular portion 22 has an inner surface 221 surrounding the joint axis (L) and defining a mounting hole 222 that extends through opposite left and right ends thereof. The mounting hole 222 has an inner portion 223, an outer portion 224 opposite to the inner portion 223 along the joint axis (L) and having a step shape, and a tapered portion 225 between the inner and outer portions 223, 224. The tapered portion 225 has a large diameter end 226 and a small diameter end 227 opposite to each other along the joint axis (L). The large diameter end 226 is adjacent to the outer portion 224, and has a diameter smaller than a smallest diameter of the outer portion 224. The small diameter end 227 is adjacent to the inner portion 223, and has a diameter smaller than that of the large diameter end 226, but larger than a diameter of the inner portion 223.

Figure 6:
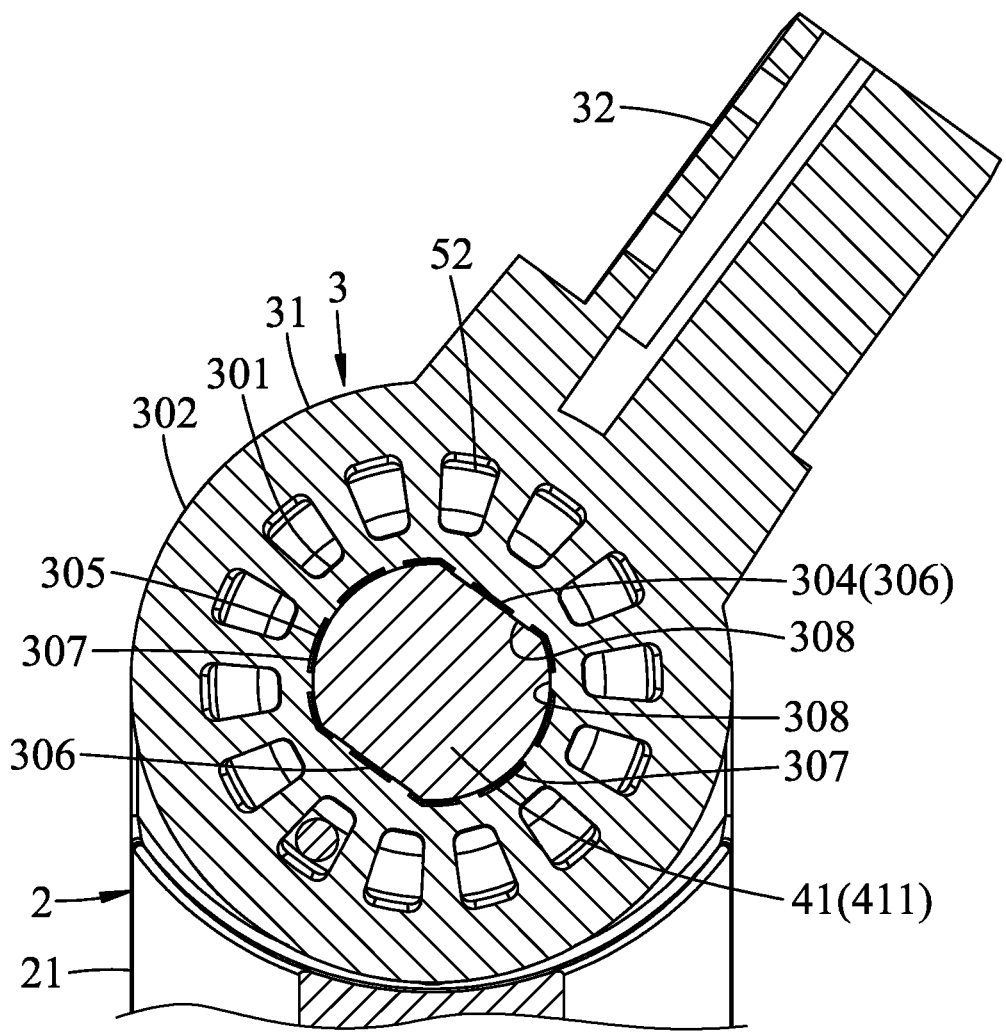
FIG. 6 is a sectional view taken along line VI-VI of FIG. 4.

Referring to FIG. 6, in combination with FIGS. 3 and 4, the rotating seat 3 is rotatably connected to the base seat 2 along the joint axis (L) such that the rotating seat 3 and the base seat 2 are rotatable relative to each other about the joint axis (L). When the base portion 21 of the base seat 2 is fixed to the fixed surface, the rotating seat 3 can be rotated relative to the base seat 2. The rotating seat 3 includes a rotating seat body 31, and a connecting portion 32 extending upwardly from the rotating seat body 31 for connection with the support frame. In this embodiment, with reference to FIG. 4, the rotating seat body 31 is connected to the left end of the tubular portion 22 of the base seat 2. The rotating seat body 31 has an inner surrounding wall 301 surrounding the joint axis (L), an outer surrounding wall 302 surrounding the inner surrounding wall 301, and an annular receiving groove 303 formed between the inner and outer surrounding walls 301, 302.

The inner surrounding wall 301 has an inner surrounding surface 304 defining a positioning hole 305 spatially communicating with the mounting hole 222. In this embodiment, the positioning hole 305 has a non-circular radial cross section, and the inner surrounding surface 304 includes two flat surfaces 306 radially opposite to each other, two curved surfaces 307 radially opposite to each other and connected between the flat surfaces 306, and a plurality of spaced-apart ribs 308 formed on and arranged around the flat and curved surfaces 306, 307. However, in other variations, the positioning hole 305 may be a polygonal hole, an irregular hole or other non-circular hole.

The shaft assembly 4 includes a rotating shaft 41, a one-way bearing 42, a tightening member 43, a limiting ring 44, and a nut 45.

The rotating shaft 41 is fixed to the rotating seat 3, and is inserted into the mounting hole 222 of the base seat 2. The rotating shaft 41 is rotatable with the rotating seat 3 relative to the base seat 2 about the joint axis (L), and has a connecting section 411 connected to the positioning hole 305 and having a shape matching that of the positioning hole 305, and an extending section 412 extending from the connecting section 411 and inserted into the mounting hole 222. With the connecting section 411 connected to the non-circular mounting hole 305, the rotating shaft 41 can be fixed to the rotating seat 3 to rotate therewith. Further, with the connecting section 411 abutting against the ribs 308 on the inner surrounding surface 304 of the rotating seat 3, removal of the rotating shaft 41 from the rotating seat 3 can be prevented, thereby increasing the positioning effect thereof.

It should be noted herein that, in this embodiment, the rotating seat 3 and the rotating shaft 41 are separately made and are then assembled together. Further, the rotating seat 3 and the rotating shaft 41 can be made from different materials. For example, the rotating shaft 41 can be made of a more durable material, such as but not limited to stainless steel; while the rotating seat 3 is made of a lightweight material, such as but not limited to plastic, so as to reduce the overall weight and the manufacturing cost. However, in other variations, the rotating seat 3 and the rotating shaft 41 may be formed integrally as one body, in this case, the positioning hole 305 in the rotating seat 3 can be omitted.

The one-way bearing 42 is sleeved on the extending section 412 of the rotating shaft 41, and is located in the tapered portion 225 of the mounting hole 222. The one-way bearing 42 has an inner friction surface 421 frictionally engaged with the extending section 412, and an outer friction surface 422 radially opposite to the inner friction surface 421.

Figure 7:
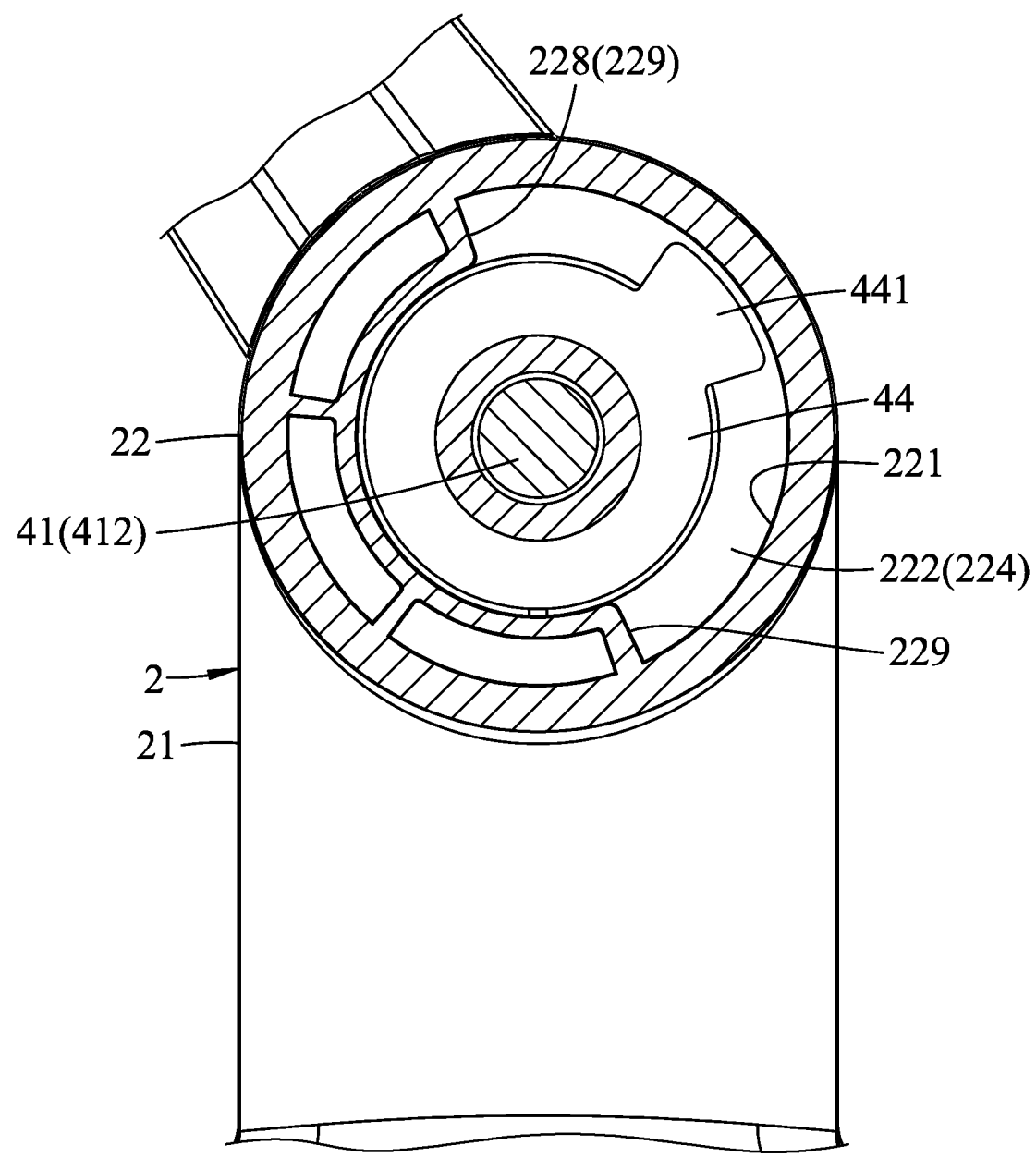
FIG. 7 is a sectional view taken along line VII-VII of FIG. 4.

Referring to FIG. 7, in combination with FIG. 4, the tightening member 43 is inserted into the tapered portion 225 of the mounting hole 222, and is press-fitted between the inner surface 221 of the tubular portion 22 and the one-way bearing 42. The tightening member 43 has a C-shaped body with a gap 433 between two ends thereof. The tightening member 43 has an inner peripheral surface 431 frictionally engaged with the outer friction surface 422 of the one-way bearing 42, and an outer peripheral surface 432 radially opposite to the inner peripheral surface 431 and pressed against the inner surface 221 of the tubular portion 22. The outer peripheral surface 432 has a shape matching that of the tapered portion 225.

The limiting ring 44 is sleeved on the extending section 412 of the rotating shaft 41, is located in the outer portion 224 of the mounting hole 222, and can rotate with the rotating shaft 41. The limiting ring 44 has a limiting piece 441 extending outwardly and radially therefrom. The inner surface 221 of the tubular portion 22 is formed with a blocking piece 228 located in the outer portion 224 of the mounting hole 222. The blocking piece 228 has two blocking ends 229 circumferentially opposite to each other. The limiting piece 441 of the limiting ring 44 is used to abut against any one of the blocking ends 229 of the blocking piece 228. Through this, the angular range of rotation of the rotating seat 3 relative to the base seat 2 can be limited.

The nut 45 is threadedly connected to a threaded portion of the extending section 412 of the rotating shaft 41 so as to prevent removal of the one-way bearing 42, the tightening member 43 and the limiting ring 44 from the rotating shaft 41.

Figure 8:
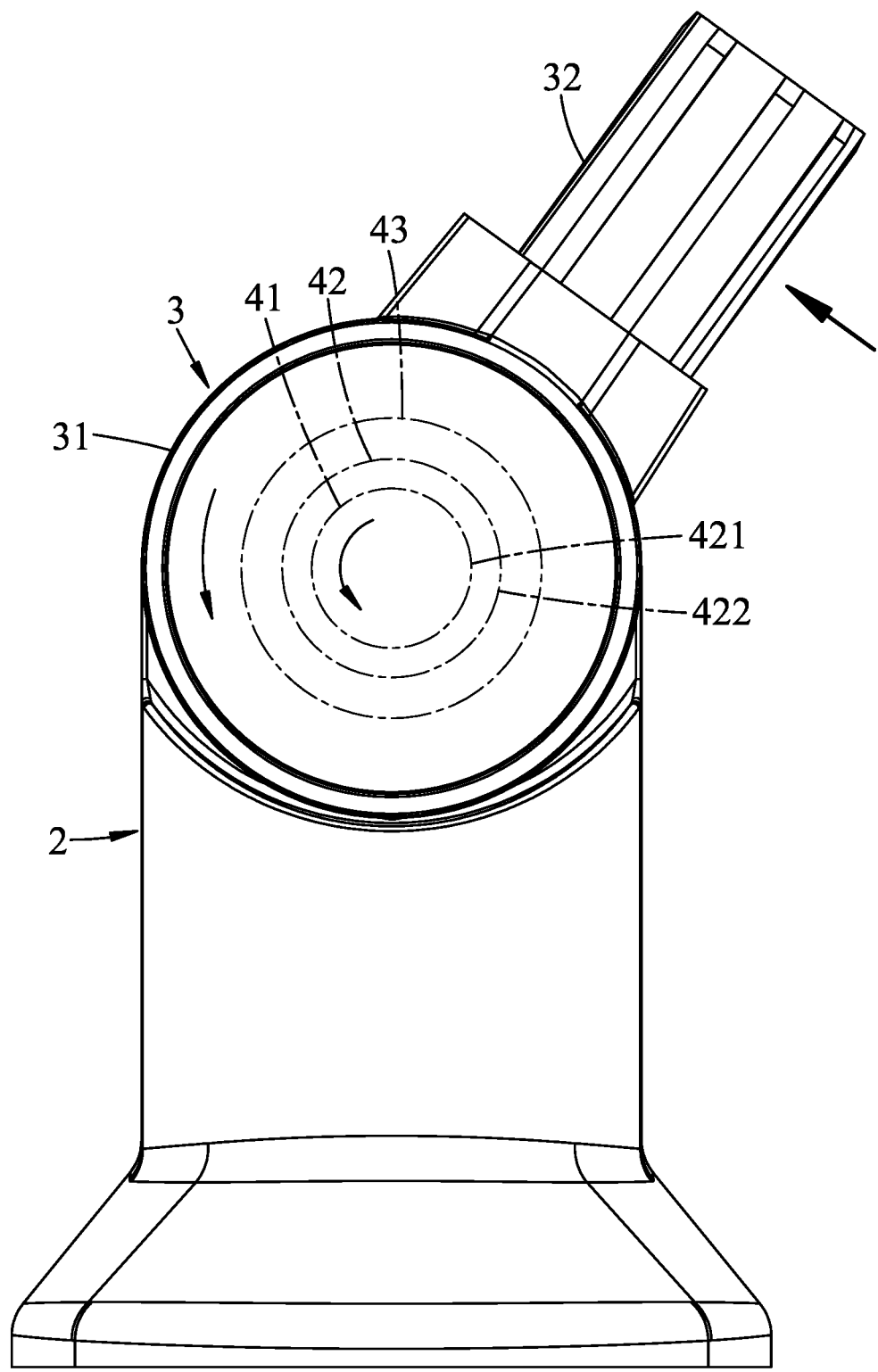
FIG. 8 is a schematic view of the embodiment as viewed from the left side of FIG. 4, illustrating how a rotating seat of this embodiment can drive a rotating shaft to rotate in a counterclockwise direction relative to a one-way bearing when the rotating seat is rotated in the counterclockwise direction.

FIG. 8 is a schematic view of the embodiment as viewed from the left side of FIG. 4. As shown in FIG. 8, when the rotating seat 3 is rotated in a counterclockwise direction relative to the base seat 2, the rotating seat 3 can drive the rotating shaft to rotate in the counterclockwise direction relative to the one-way bearing 42. When rotation of the rotating seat 3 is stopped, the rotating seat 3 can be positioned through the friction between the inner friction surface 421 of the one-way bearing 42 and the rotating shaft 41.

Figure 9:
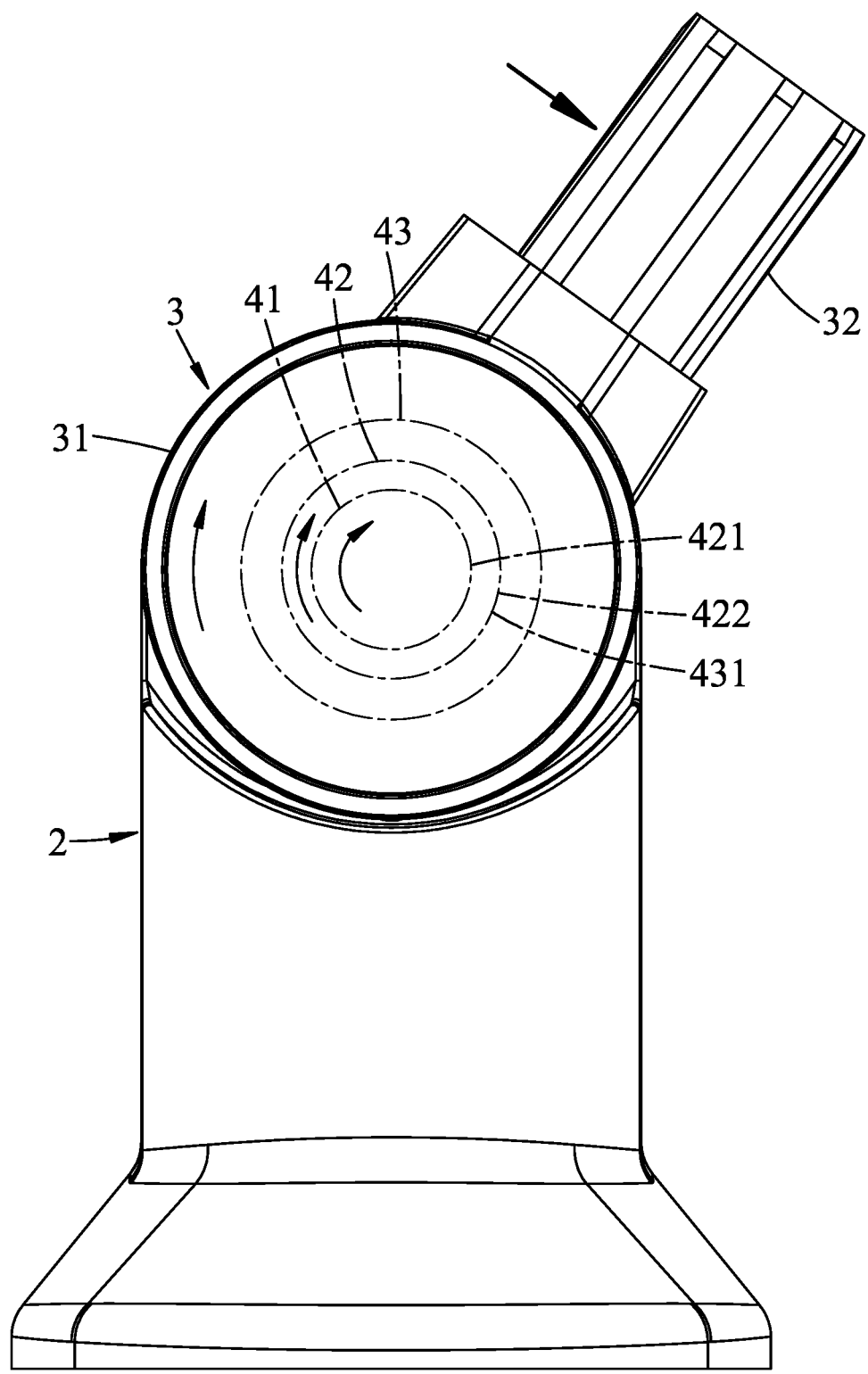
FIG. 9 is a view similar to FIG. 8, but illustrating how the rotating seat can drive the rotating shaft and the one-way bearing to simultaneously rotate in a clockwise direction relative to a tightening member when the rotating seat is rotated in the clockwise direction.

FIG. 9 is a view similar to FIG. 8. As shown in FIG. 9, when the rotating seat 3 is rotated in a clockwise direction, because the one-way bearing 42 cannot rotate in the counterclockwise direction, the rotating seat 3 can drive the rotating shaft 41 and the one-way bearing 42 to rotate in the clockwise direction relative to the tightening member 43 after overcoming the friction between the outer friction surface 422 of the one-way bearing 42 and the inner peripheral surface 431 of the tightening member 43. When rotation of the rotating seat 3 is stopped, the rotating seat 3 can be positioned through the friction between the outer friction surface 422 of the one-way bearing 42 and the inner peripheral surface 431 of the tightening member 43.

Figure 10:
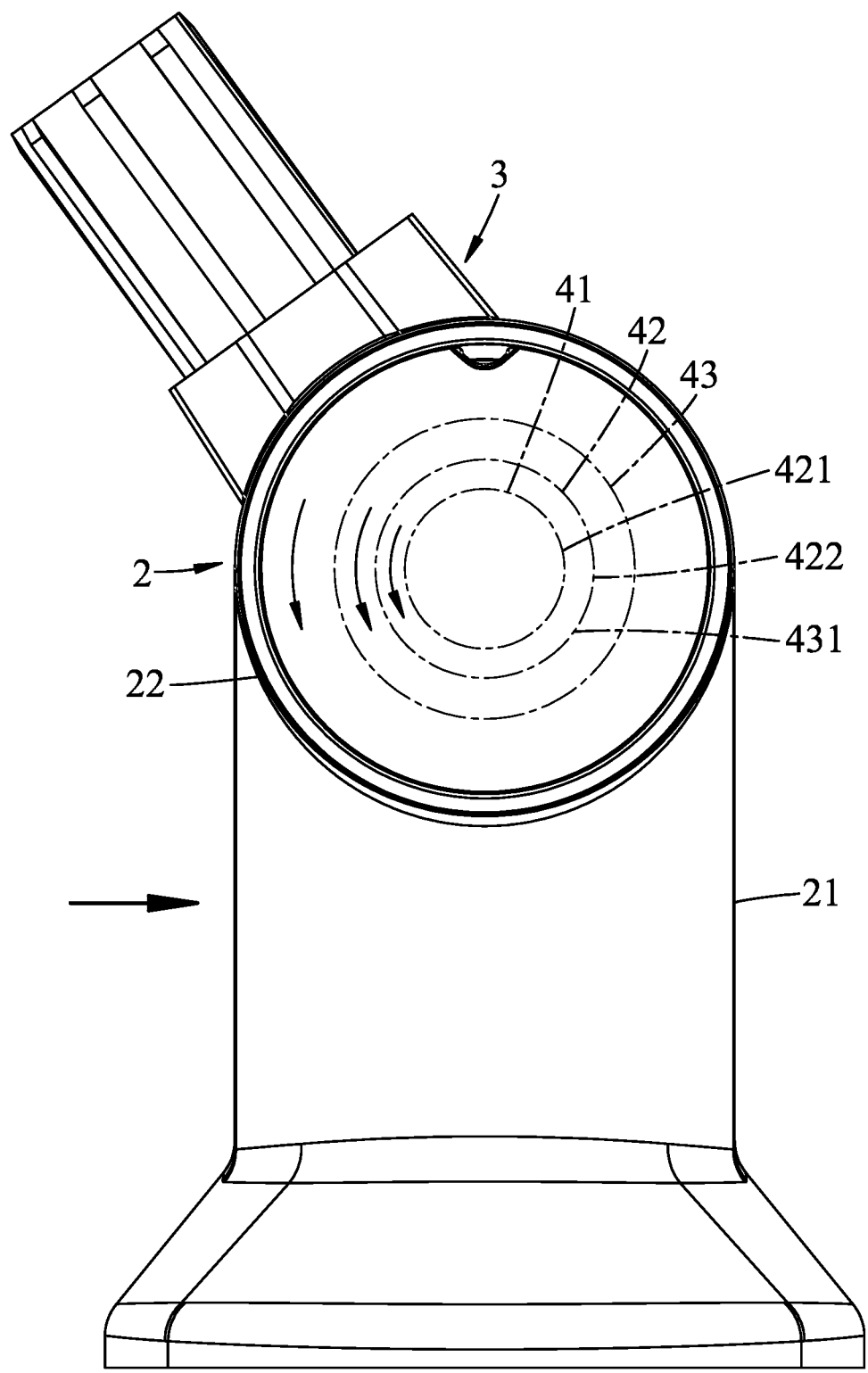
FIG. 10 is a schematic view of the embodiment as viewed from the right side of FIG. 4, illustrating how the base seat of this embodiment can drive the tightening member and the one-way bearing to simultaneously rotate in a counterclockwise direction relative to the rotating shaft when the base seat is rotated in the counterclockwise direction.

FIG. 10 is a schematic view of the embodiment as viewed from the right side of FIG. 4. As shown in FIG. 10, when the base seat 2 is rotated in a counterclockwise direction relative to the rotating seat 3 before it is fixed to the fixed surface, the base seat 2 can drive the tightening member 43 and the one-way bearing 42 to rotate in the counterclockwise direction relative to the rotating shaft 41. When rotation of the base seat 2 is stopped, the base seat 2 can be positioned through the friction between the inner friction surface 421 of the one-way bearing 42 and the rotating shaft 41.

Figure 11:
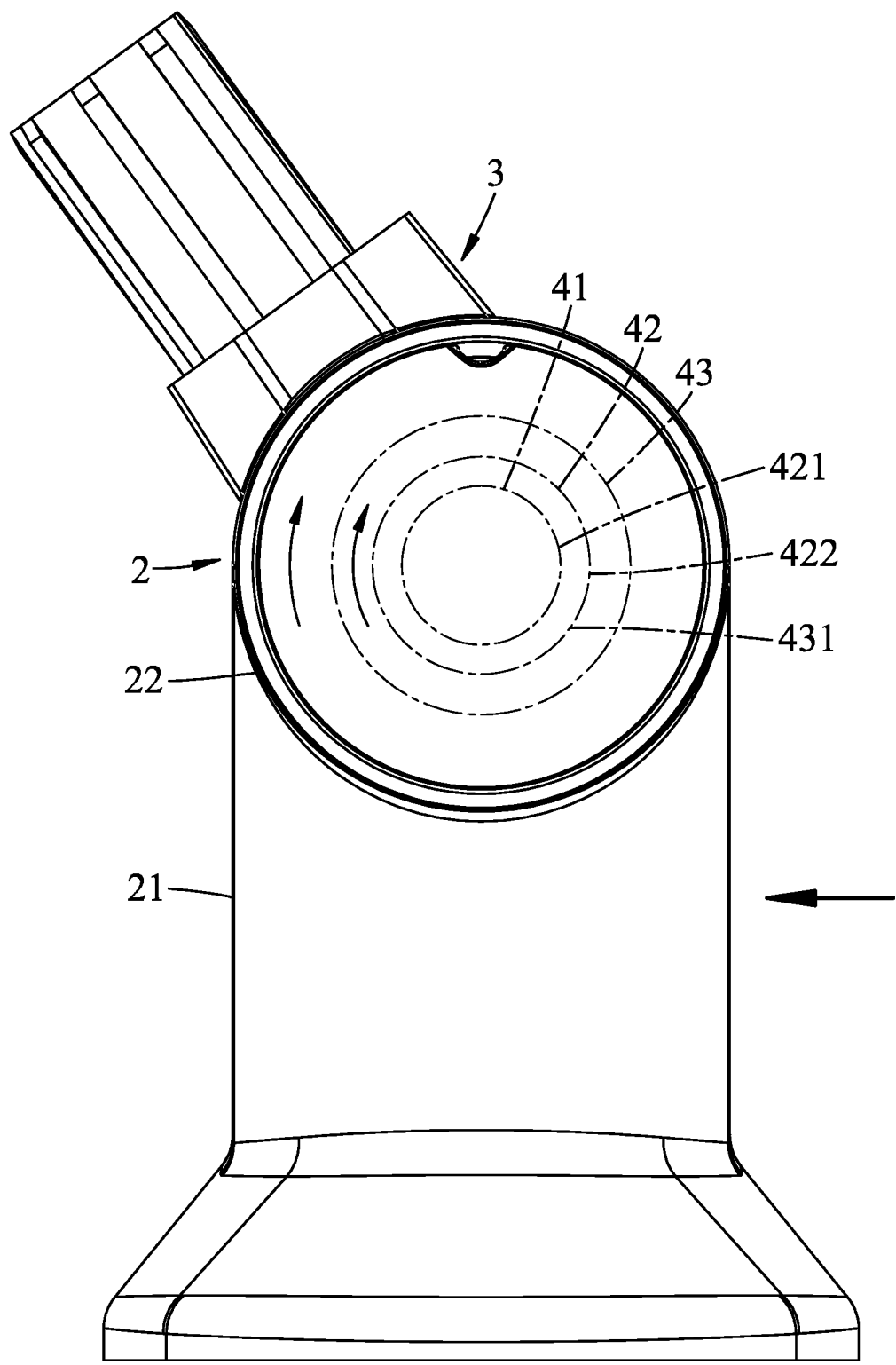
FIG. 11 is a view similar to FIG. 10, but illustrating how the base seat can drive the tightening member to rotate in a clockwise direction relative to the one-way bearing when the base seat is rotated in the clockwise direction.

FIG. 11 is a view similar to FIG. 10. As shown in FIG. 11, when the base seat 2 is rotated in a clockwise direction relative to the rotating seat 3, because the one-way bearing 42 cannot rotate in the clockwise direction, the base seat 2 can only drive the tightening member 43 to rotate in the clockwise direction relative to rotating shaft 41 after overcoming the friction between the outer friction surface 422 of the one-way bearing 42 and the inner peripheral surface 431 of the tightening member 43. When rotation of the base seat 2 is stopped, the base seat 2 can be positioned through the friction between the tightening member 43 and the one-way bearing 42.

Thus, in this disclosure, after the rotating seat 3 or the base seat 2 is rotated to a desired angle, the friction between the components can be used to achieve the positioning thereof, so that use of this disclosure is easy and convenient.

Figure 12:
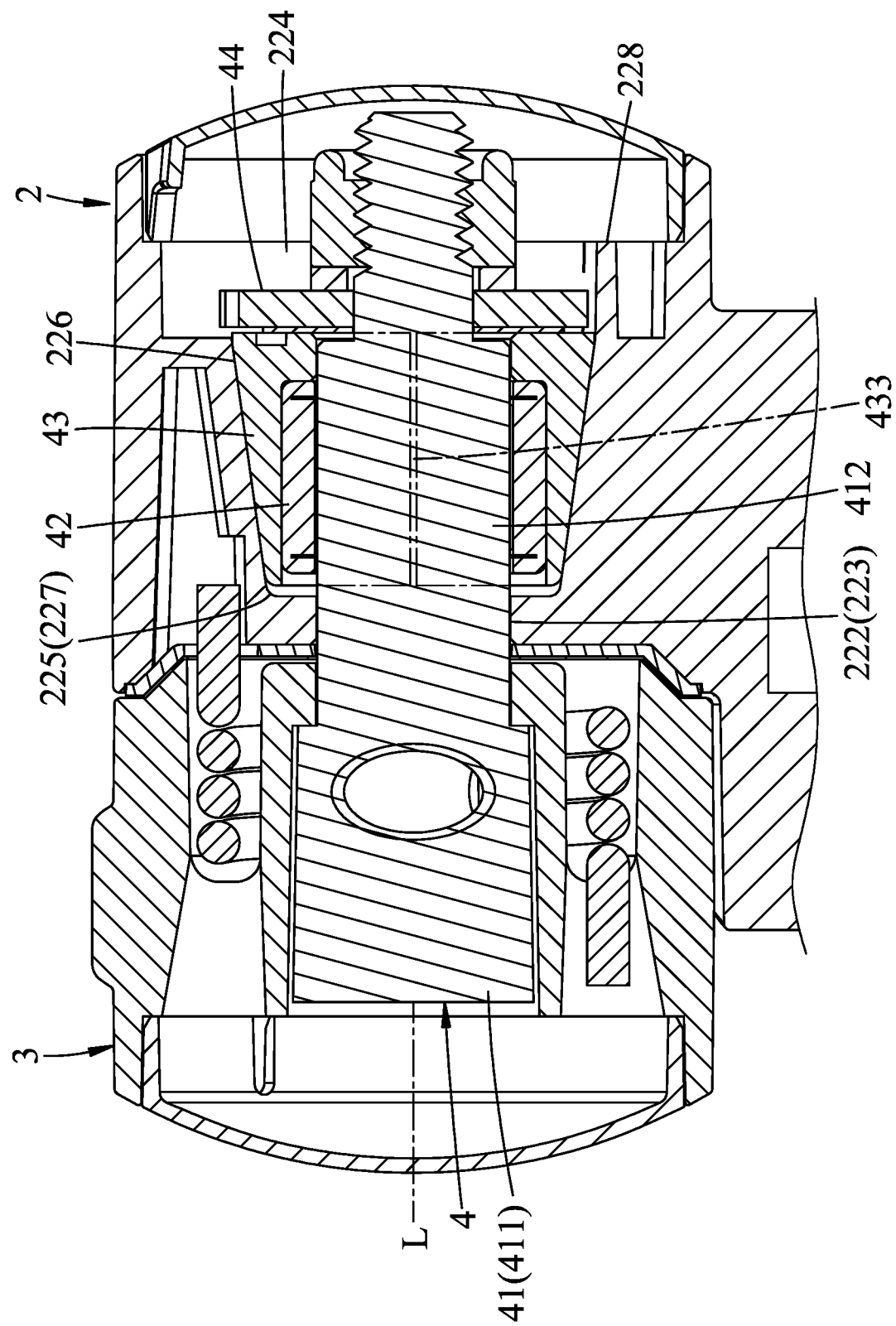
FIG. 12 is a view similar to FIG. 4, but illustrating how a gap of the tightening member is reduced when it is moved into the base seat.

Referring to FIG. 12, in combination with FIG. 4, additionally, when the tightening member 43 is gradually inserted from the large diameter end 226 to the small diameter end 227 of the mounting hole 222, the gap 433 thereof gradually reduces, thereby changing the friction between the tightening member and the base seat 2 and between the tightening member 43 and the one-way bearing 42. Hence, in this embodiment, the friction between the tightening member 43 and the base seat 2 and between the tightening member 43 and the one-way bearing 42 can be adjusted by adjusting the size of the gap 433.

Figure 13:
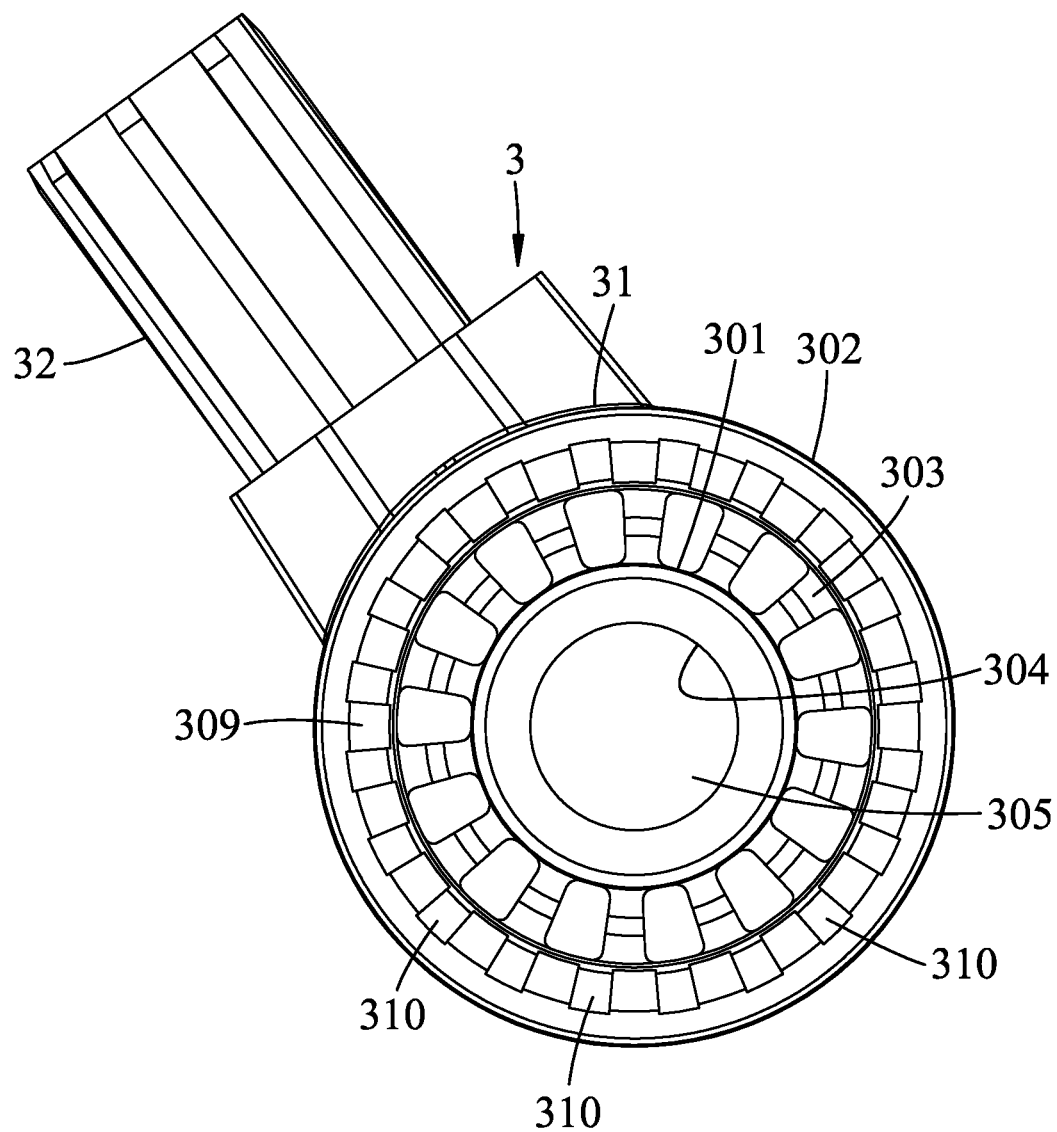
FIG. 13 is a side view of the rotating seat of this embodiment.

Referring to FIG. 13, in combination with FIGS. 3 and 4, the resistance unit 5 includes a washer 51 and a torsion spring 52.

The washer 51 is sleeved on the extending section 412 of the rotating shaft 41, and is frictionally engaged between the tubular portion 22 of the base seat 2 and the rotating seat 3 for increasing rotational friction between the base seat 2 and the rotating seat 3. The washer 51 has an annular plate 510, and an annular inclined flange 511 extending outwardly and inclinedly from an outer periphery of the annular plate 510 toward the rotating seat 3. The outer surrounding wall 302 of the rotating seat has an annular rim 309 protruding outwardly therefrom and having a shape matching that of the annular inclined flange 511 for abutment therewith. The annular rim 309 has a plurality of protrusions 310 angularly arranged on an outer surface thereof for abutting against the annular inclined flange 511 and for increasing the rotational friction between the base seat 2 and the rotating seat 3.

Figure 14:
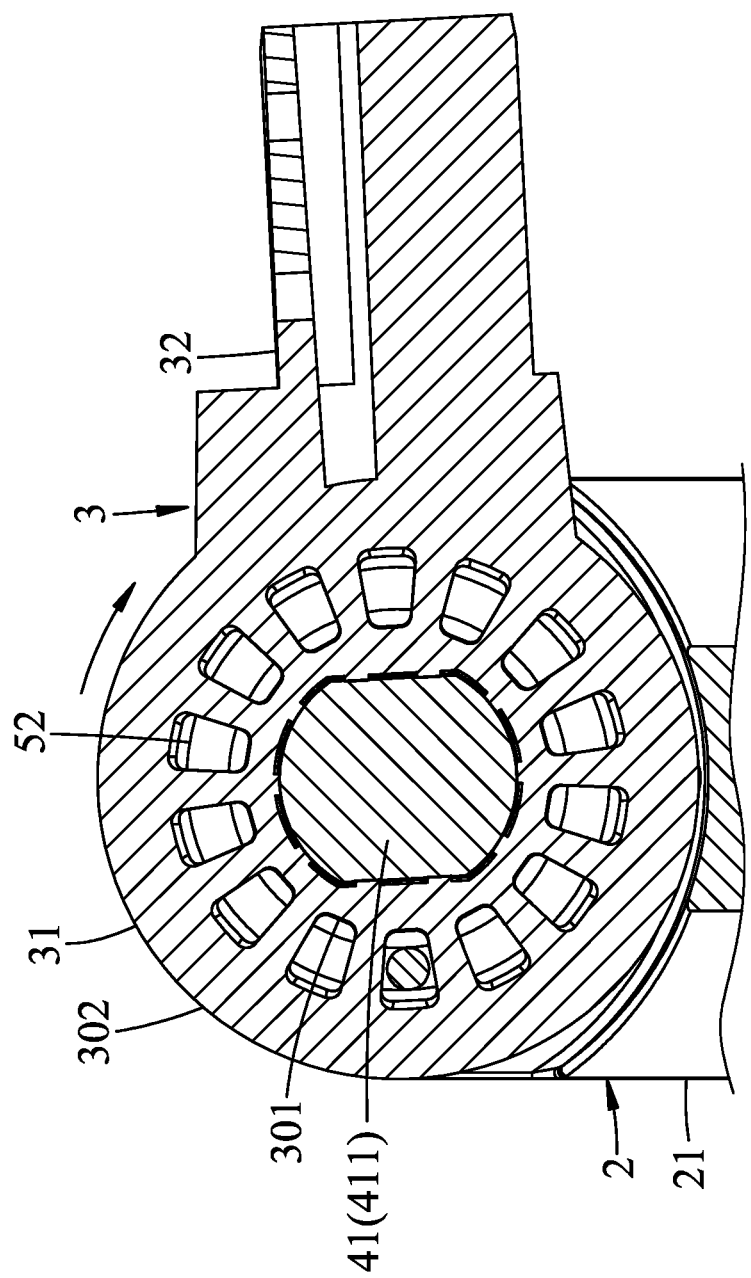
FIG. 14 is a view similar to FIG. 6, but illustrating how a torsion spring of a resistance unit can be tightened when the rotating seat is rotated relative to the base seat in a clockwise direction.

Referring to FIG. 14, in combination with FIG. 4, in this embodiment, the torsion spring 52 is sleeved on the connecting section 411 of the rotating shaft 41, and is received in the receiving groove 303. The torsion spring 52 has two opposite ends respectively fixed to the tubular portion 22 of the base seat 2 and the rotating seat 3 for increasing rotational resistance between the base seat 2 and the rotating seat 3.

Figure 15:
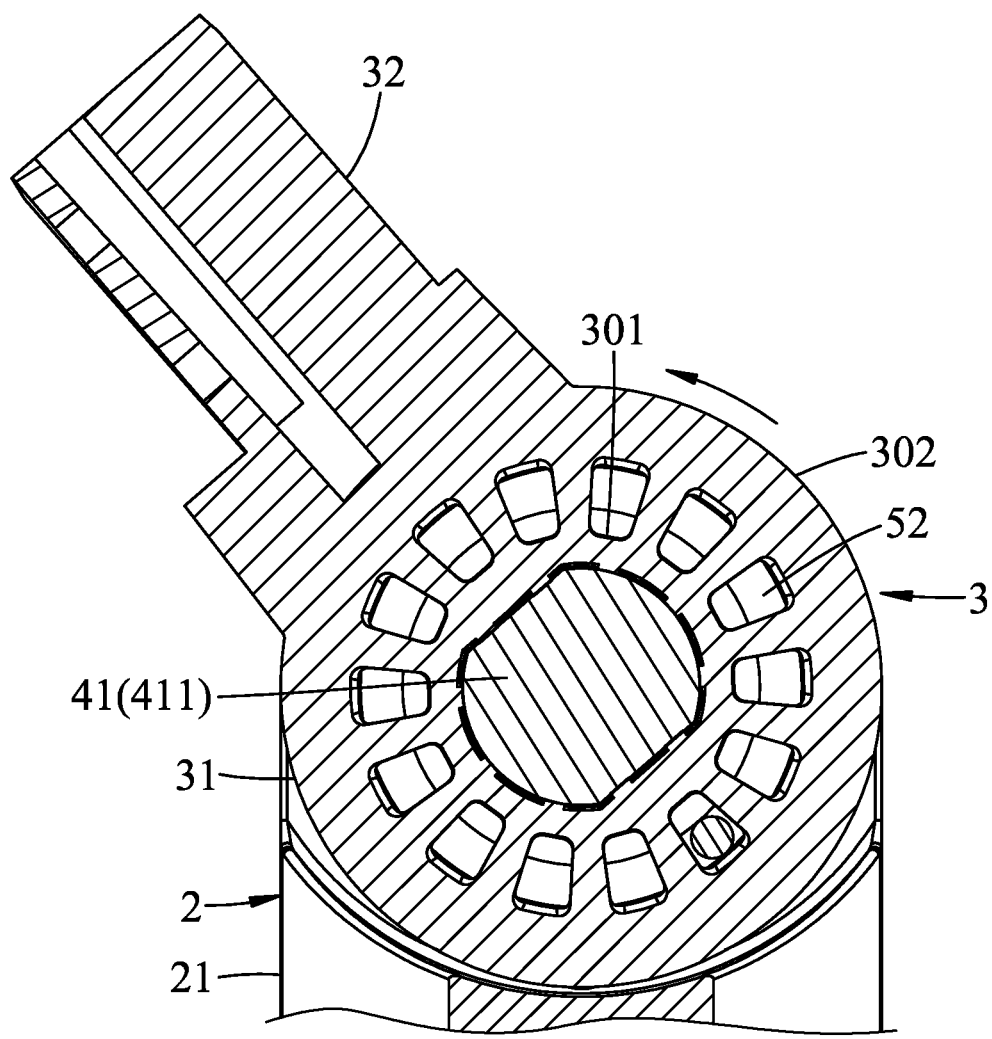
FIG. 15 is a view similar to FIG. 6, but illustrating how the torsion spring can be loosened when the rotating seat is rotated relative to the base seat in a counterclockwise direction.

When the rotating seat 3 is rotated relative to the base seat 2 in a clockwise direction, as shown in FIG. 14, the torsion spring 52 can be tightened to reduce an inner diameter thereof; and, when the rotating seat 3 is rotated relative to the base seat 2 in a counterclockwise direction, as shown in FIG. 15, the torsion spring 52 can be loosened to increase the inner diameter thereof. It should be noted that the base seat 2 can also be rotated relative to the rotating seat 3 to tighten or loosen the torsion spring 52. Hence, by rotating the rotating seat 3 or the base seat 2 to tighten or loosen the torsion spring 52, the rotational resistance between the base seat 2 and the rotating seat 3 can be selectively increased or decreased.

Moreover, in this disclosure, with the one-way bearing 42 sleeved on the extending section 412 of the rotating shaft 41, and with the tightening member 43 press-fitted between the inner surface 221 of the tubular portion 22 and the one-way bearing 42, when the rotating seat 3 or the base seat 2 is rotated to a desired angle, the positioning thereof can be achieved through the friction between these components, so that use of the disclosure is easy and convenient. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A joint device configured to be connected to a support frame, comprising:

a base seat having an inner surface that surrounds a joint axis and that defines a mounting hole extending therethrough, said mounting hole having a tapered portion, said tapered portion having a first end and a second end opposite to each other along the joint axis, said first end having a diameter larger than a diameter of said second end;

a rotating seat rotatably connected to said base seat, said rotating seat and said base seat being rotatable relative to each other about the joint axis;

a shaft assembly including a rotating shaft fixed to said rotating seat and inserted into said mounting hole of said base seat, a one-way bearing sleeved on said rotating shaft and located in said tapered portion of said mounting hole, and a tightening member inserted into said mounting hole and press-fitted between said inner surface of said base seat and said one-way bearing, said rotating shaft being rotatable with said rotating seat relative to said base seat about the joint axis, said one-way bearing having an inner friction surface frictionally engaged with said rotating shaft, and an outer friction surface radially opposite to said inner friction surface, said tightening member having a C-shaped body with a gap between two ends thereof, said tightening member having an inner peripheral surface frictionally engaged with said outer friction surface of said one-way bearing, and an outer peripheral surface radially opposite to said inner peripheral surface and pressed against said inner surface of said base seat, said outer peripheral surface of said tightening member having a shape matching a shape of said tapered portion of said mounting hole, wherein, said gap of said tightening member gradually reduces as said tightening member gradually moves between said inner surface of said base seat and said one-way bearing from said first end to said second end of said tapered portion of said mounting hole; and a resistance unit which includes a torsion spring sleeved on said rotating shaft and having two opposite ends respectively fixed to said base seat and said rotating seat for increasing rotational resistance between said base seat and said rotating seat.

2. The joint device as claimed in claim 1, wherein said mounting hole of said base seat further has an outer portion adjacent to said first end of said tapered portion, said inner surface of said base seat being formed with a blocking piece located in said outer portion of said mounting hole, said blocking piece having two blocking ends circumferentially opposite to each other, said shaft assembly further including a limiting ring that is sleeved on said rotating shaft, that is located in said outer portion of said mounting hole, and that is configured to rotate with said rotating shaft, said limiting ring having a limiting piece extending outwardly and radially therefrom for abutting against any one of said blocking ends of said blocking piece.

3. A joint device configured to be connected to a support frame, comprising:

a base seat having an inner surface that surrounds a joint axis and that defines a mounting hole extending therethrough, said mounting hole having a tapered portion, said tapered portion having a first end and a second end opposite to each other along the joint axis, said first end having a diameter larger than a diameter of said second end;

a rotating seat rotatably connected to said base seat, said rotating seat and said base seat being rotatable relative to each other about the joint axis;

a shaft assembly including a rotating shaft fixed to said rotating seat and inserted into said mounting hole of said base seat, a one-way bearing sleeved on said rotating shaft and located in said tapered portion of said mounting hole, and a tightening member inserted into said mounting hole and press-fitted between said inner surface of said base seat and said one-way bearing, said rotating shaft being rotatable with said rotating seat relative to said base seat about the joint axis, said one-way bearing having an inner friction surface frictionally engaged with said rotating shaft, and an outer friction surface radially opposite to said inner friction surface, said tightening member having a C-shaped body with a gap between two ends thereof, said tightening member having an inner peripheral surface frictionally engaged with said outer friction surface of said one-way bearing, and an outer peripheral surface radially opposite to said inner peripheral surface and pressed against said inner surface of said base seat, said outer peripheral surface of said tightening member having a shape matching a shape of said tapered portion of said mounting hole, wherein, said gap of said tightening member gradually reduces as said tightening member gradually moves between said inner surface of said base seat and said one-way bearing from said first end to said second end of said tapered portion of said mounting hole; and a resistance unit which includes a washer sleeved on said rotating shaft and frictionally engaged between said base seat and said rotating seat for increasing rotational friction between said base seat and said rotating seat.

4. The joint device as claimed in claim 3, wherein said washer has an annular plate, and an annular inclined flange extending outwardly and inclinedly from an outer periphery of said annular plate toward said rotating seat, said rotating seat having an annular rim protruding outwardly therefrom and having a shape matching a shape of said annular inclined flange for abutment therewith.

5. The joint device as claimed in claim 4, wherein said annular rim has a plurality of protrusions angularly arranged on an outer surface thereof for abutting against said annular inclined flange.

6. A joint device configured to be connected to a support frame, comprising:

a base seat having an inner surface that surrounds a joint axis and that defines a mounting hole extending therethrough, said mounting hole having a tapered portion, said tapered portion having a first end and a second end opposite to each other along the joint axis, said first end having a diameter larger than a diameter of said second end;

a rotating seat rotatably connected to said base seat, said rotating seat and said base seat being rotatable relative to each other about the joint axis; and a shaft assembly including a rotating shaft fixed to said rotating seat and inserted into said mounting hole of said base seat, a one-way bearing sleeved on said rotating shaft and located in said tapered portion of said mounting hole, and a tightening member inserted into said mounting hole and press-fitted between said inner surface of said base seat and said one-way bearing, said rotating shaft being rotatable with said rotating seat relative to said base seat about the joint axis, said one-way bearing having an inner friction surface frictionally engaged with said rotating shaft, and an outer friction surface radially opposite to said inner friction surface, said tightening member having a C-shaped body with a gap between two ends thereof, said tightening member having an inner peripheral surface frictionally engaged with said outer friction surface of said one-way bearing, and an outer peripheral surface radially opposite to said inner peripheral surface and pressed against said inner surface of said base seat, said outer peripheral surface of said tightening member having a shape matching a shape of said tapered portion of said mounting hole, wherein, said gap of said tightening member gradually reduces as said tightening member gradually moves between said inner surface of said base seat and said one-way bearing from said first end to said second end of said tapered portion of said mounting hole;

wherein said rotating seat defines a positioning hole spatially communicating with said mounting hole of said base seat, and said rotating shaft is positioned in said positioning hole; and wherein said rotating seat has an inner surrounding surface defining said positioning hole, and a plurality of spaced-apart ribs formed on and arranged around said inner surrounding surface for abutting against said rotating shaft.

7. The joint device as claimed in claim 6, wherein said positioning hole has a non-circular radial cross section.

* * * * *